United States Patent
Chen et al.

(10) Patent No.: US 10,330,986 B2
(45) Date of Patent: Jun. 25, 2019

(54) EXPOSURE SYSTEM AND EXPOSURE METHOD

(71) Applicant: InnoLux Corporation, Jhu-Nan, Miao-Li County (TW)

(72) Inventors: Yu-Ju Chen, Miao-Li County (TW); Chun-Teng Chen, Miao-Li County (TW); Yao-Teng Tseng, Miao-Li County (TW); Chen-Kuan Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/361,209

(22) Filed: Nov. 25, 2016

(65) Prior Publication Data

US 2017/0146865 A1 May 25, 2017

(30) Foreign Application Priority Data

Nov. 25, 2015 (CN) .......................... 2015 1 0827544

(51) Int. Cl.
*G02F 1/13* (2006.01)
*G02F 1/1337* (2006.01)

(52) U.S. Cl.
CPC ...... *G02F 1/133788* (2013.01); *G02F 1/1303* (2013.01); *G02F 1/133711* (2013.01)

(58) Field of Classification Search
CPC ................................................ G02F 1/133788
See application file for complete search history.

(56) References Cited

U.S. PATENT DOCUMENTS

| 4,015,340 A * | 4/1977 | Treleven .................. F26B 3/28 250/504 R |
| 2009/0002669 A1* | 1/2009 | Liu ........................ G03F 7/7005 355/67 |
| 2009/0256086 A1* | 10/2009 | Hakoi ............... G02F 1/133788 250/492.1 |
| 2015/0194231 A1* | 7/2015 | Lee ....................... G02F 1/1303 250/454.11 |

\* cited by examiner

*Primary Examiner* — Alexander P Gross
(74) *Attorney, Agent, or Firm* — Muncy, Geissler, Olds & Lowe, PC

(57) ABSTRACT

An exposure system and a manufacturing method of a component of a display panel are disclosed. The exposure system includes a carrying device and a light source device. The carrying device carries the object. The light source device, including a plurality of lamp sets arranged along a first direction, emits light to irradiate the object. The lamp sets include a first lamp set and a second lamp set, which are disposed adjacent to each other. The first lamp set has a first lamp and a second lamp, which are extending along a second direction. The second lamp set has a third lamp and a fourth lamp, which are extending along the second direction. The first and second lamps are connected with a first junction, and the third and fourth lamps are connected with a second junction. The first junction and the second junction are misaligned on the first direction.

9 Claims, 7 Drawing Sheets

EXPOSURE SYSTEM AND EXPOSURE METHOD

CROSS REFERENCE TO RELATED APPLICATIONS

This Non-provisional application claims priority under 35 U.S.C. § 119(a) on Patent Application No(s). 201510827544.X filed in People's Republic of China on Nov. 25, 2015, the entire contents of which are hereby incorporated by reference.

BACKGROUND

Technical Field

The present disclosure relates to an exposure system and an exposure method.

Related Art

As the progress of technology, the flat display device has been widely applied to various fields. In particular, the liquid crystal display (LCD) device has the advantages of light weight, thin, low power consumption, and no radiation, so it gradually replaces the traditional CRT display device. The LCD device can be applied to many electronic devices such as mobile phone, portable multimedia device, laptop computer, LCD TV and LCD monitor.

For example, in order to improve the multi-domain vertical alignment (MVA) technology of TFT LCD, the manufacturer utilizes a PSA (polymer sustained alignment) technology in the exposure process to enhance the optical properties of the LCD device, such as the aperture ratio and contrast. In more detailed, the PSA technology is to add light-reaction monomers into the liquid crystal molecules in the ODF (one drop filling) process. After applying electricity, the UV light is provided to cure the light-reaction monomers in the liquid crystal molecules, and the cured light-reaction monomers are arranged according to the pattern of a patterned transparent conductive layer of the TFT substrate. Accordingly, the cured light-reaction monomers can achieve the purpose of liquid crystal alignment.

In the conventional PSA exposure apparatus, the UV light is provided from a fixed light source and has a constant illuminance. Cooperating with a reflective plate, the UV light can continuously irradiate the light-reaction monomers in the liquid crystal layer of a panel located at a fixed distance, thereby inducing the light polymerization. Accordingly, the liquid crystal molecules can be aligned with multi-domain vertical alignment. However, in the exposure process of large sized panel, if the lamps of the exposure machine are too long, the lamp bending issue may incur. Otherwise, the long lamps may have uneven light intensity due to the non-uniform internal coating, which can cause the insufficient exposure evenness.

SUMMARY

An objective of the present disclosure is to provide an exposure system and an exposure method that can achieve the desired exposure evenness.

To achieve the above objective, the present disclosure discloses an exposure system used to perform an exposure process to an object. The exposure system includes a carrying device and a light source device. The carrying device carries the object. The light source device is disposed on the carrying device and emits light to irradiate the object. The light source device includes a plurality of lamp sets arranged along a first direction. The lamp sets include a first lamp set and a second lamp set, which are disposed adjacent to each other. The first lamp set has a first lamp and a second lamp, which are extending along a second direction. The second direction crosses with the first direction. The second lamp set has a third lamp and a fourth lamp, which are extending along the second direction. The first and second lamps are connected with a first junction, and the third and fourth lamps are connected with a second junction. The first junction and the second junction are misaligned along the first direction.

To achieve the above objective, the present disclosure also discloses a manufacturing method of a component of a display panel. The manufacturing method includes the following steps of: providing the component of the display panel; relatively moving a light source device and the component, wherein the light source device has a plurality of lamp sets arranged along a first direction; and emitting light from the lamp sets to irradiate the component. The lamp sets include a first lamp set and a second lamp set, which are disposed adjacent to each other. The first lamp set has a first lamp and a second lamp, which are extending along a second direction. The second direction crosses with the first direction. The second lamp set has a third lamp and a fourth lamp, which are extending along the second direction. The first and second lamps are connected with a first junction, and the third and fourth lamps are connected with a second junction. The first junction and the second junction are misaligned along the first direction.

In one embodiment, the first lamp has a first end located at a side of the light source device, and the third lamp has a second end located at the side of the light source device. A shortest distance between an extension line of the first end along the first direction and another extension line of the second end along the first direction is greater than or equal to 2% of a length of the first lamp of the light source device along the second direction, and is less than or equal to 50% of the length of the first lamp of the light source device along the second direction.

In one embodiment, the lengths of the first lamp and the second lamp along the second direction are different.

In one embodiment, the lamp sets have a first side and an opposite second side along the second direction, and the first side and the second side are not even.

In one embodiment, the lamp sets completely cover the object or component on a third direction, which is substantially perpendicular to the first and second directions.

In one embodiment, the lamp sets further includes a third lamp set, which is not disposed adjacent to the first lamp set. The third lamp set has a fifth lamp and a sixth lamp, which are extending along the second direction. The fifth and sixth lamps are connected with a third junction, the third junction is located on an extension line from the first junction along the first direction, and at least one lamp set is configured between the first and third junctions.

In one embodiment, the object or component is a liquid crystal cell assembly or a transparent substrate with an alignment film.

In one embodiment, the step of relatively moving the light source device and the component is to relatively move the lamp sets and the component along the first direction or the second direction, or to relatively rotate the lamp sets and the component.

In one embodiment, the lamp sets emit light to irradiate an irradiation zone, and the component is within the irradiation zone in the step of relatively moving the light source device and the component.

As mentioned above, the light source device has a plurality of lamp sets, each of which is composed of multiple bar-type lamps. Accordingly, the junction between two lamps has relative lower illuminance. In this disclosure, the junctions of the adjacent lamp sets are misaligned in one direction, and the light source device and the object (or component) are relatively moved. Therefore, the percentage of the exposure uniformity of the object (or component) under the same amount of light is lower, thereby achieving the purpose of high exposure evenness.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE INVENTION

The embodiments of the disclosure will be apparent from the following detailed description, which proceeds with reference to the accompanying drawings, wherein the same references relate to the same elements.

Figure 1A:
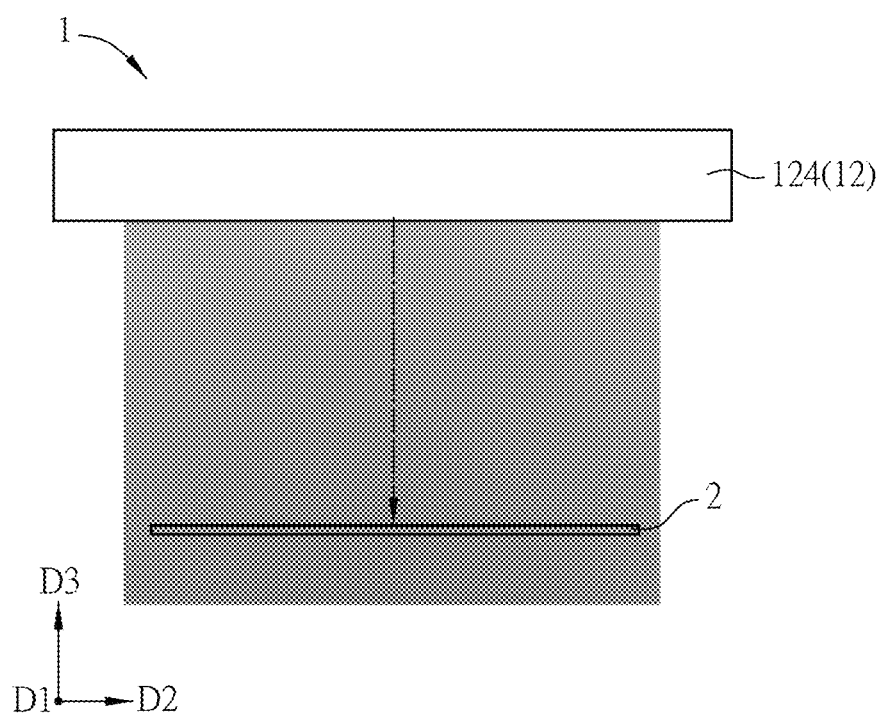
FIG. 1A is a schematic diagram showing an exposure system, which performs an exposure process to an object, according to an embodiment of the disclosure.
Figure 1B:
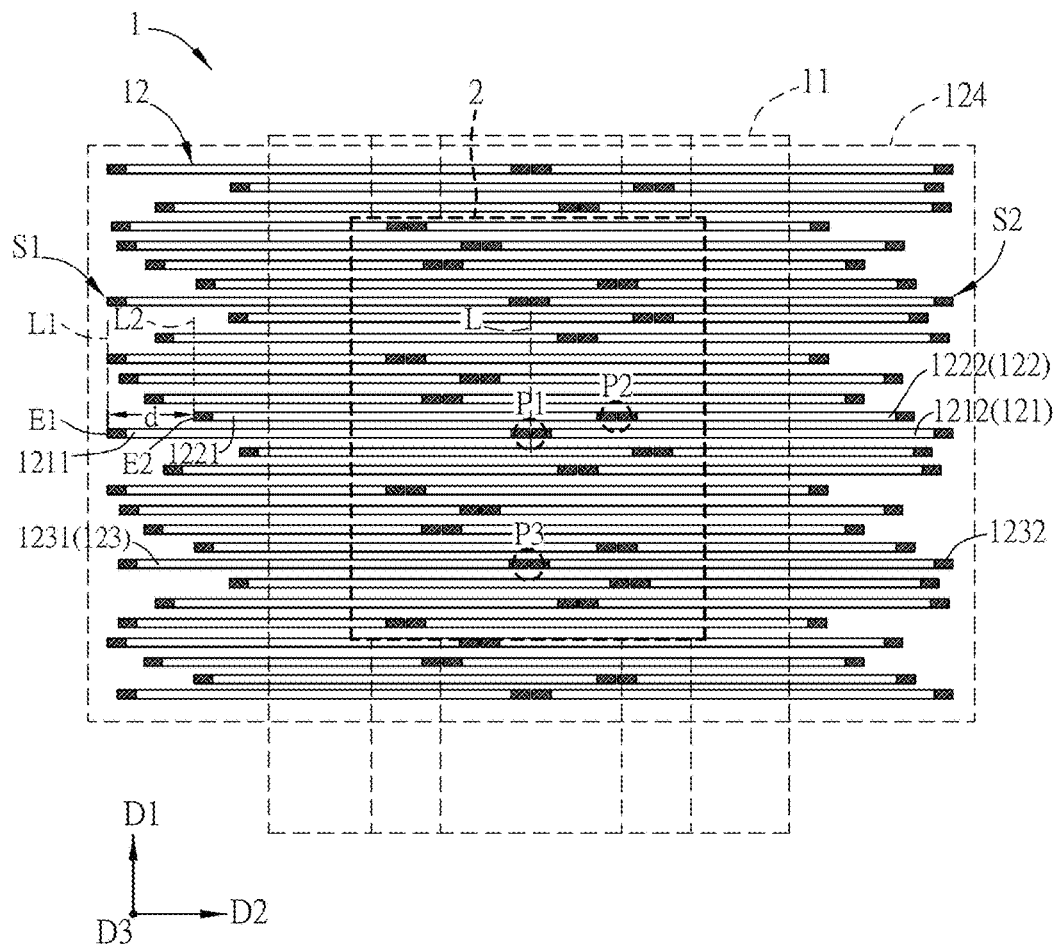
FIG. 1B is a top view of the exposure system of FIG. 1A.

FIG. 1A is a schematic diagram showing an exposure system 1, which performs an exposure process to an object 2, according to an embodiment of the disclosure. FIG. 1B is a top view of the exposure system 1 of FIG. 1A. To be noted, FIG. 1A does not show the carrying device 11 of the exposure system 1, and FIG. 1B is a top view of the exposure system 1 of FIG. 1A along a third direction D3.

The exposure system 1 is used to perform an exposure process to an object 2. In this embodiment, the exposure system 1 includes a carrying device 11 and a light source device 12. The object 2 can be a transparent substrate with an alignment film or a liquid crystal cell assembly. Of course, the object 2 can be any panel, substrate or object that to be exposed in an exposure process by an exposure machine (or the light source device 12).

If the object 2 is a transparent substrate with an alignment film, the lamps of the light source device 12 emit polarized UV light for inducing the non-uniform light polymerization, isomerization or cleavage reaction of the molecule structure of the alignment film, which is usually made of polyimide (PI). Accordingly, the chemical bond structure of the alignment film surface is arranged in a specific direction, so that the liquid crystal molecules are arranged in the desired direction so as to achieve the purpose of alignment.

If the object 2 is a liquid crystal cell assembly, the exposure system 1 performs an exposure process to the liquid crystal cell assembly, so that the light reaction monomers in the alignment film and/or the liquid crystal molecules of the liquid crystal cell assembly can be polymerized to form a polymer alignment layer for arranging the liquid crystal molecules. Herein, the term "liquid crystal cell assembly" means a large panel that is assembled with an upper substrate and a lower substrate and is filled with a liquid crystal layer, but before cutting into multiple of single display substrates. Each liquid crystal cell assembly may contain one display panel (including one upper substrate, one lower substrate and one liquid crystal layer) or multiple display panels (including multiple upper substrates, lower substrates and liquid crystal layers). The number of display panels contained in the liquid crystal cell assembly is not limited in this disclosure.

The structures of display panels 3 and 3a will be described with reference to FIGS. 2A and 2B. Herein, FIGS. 2A and 2B show a display panel 3 and a display panel 3a, respectively, instead of the structure of a liquid crystal cell assembly, which may include one display panel 3 or 3a, or multiple display panels 3 and 3a.

Figure 2A:
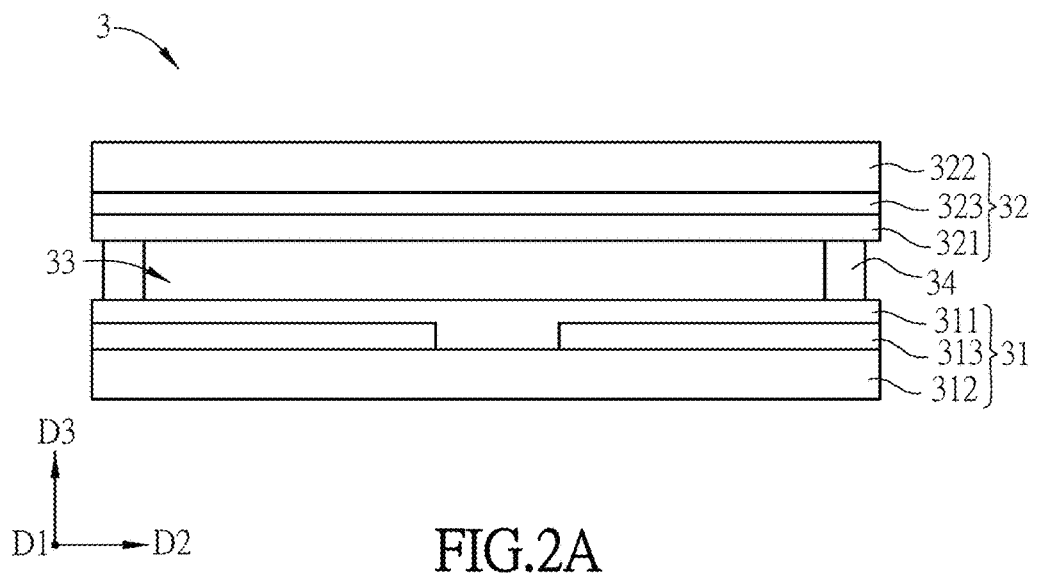
FIG. 2A is a sectional view of a display panel.
Figure 2B:
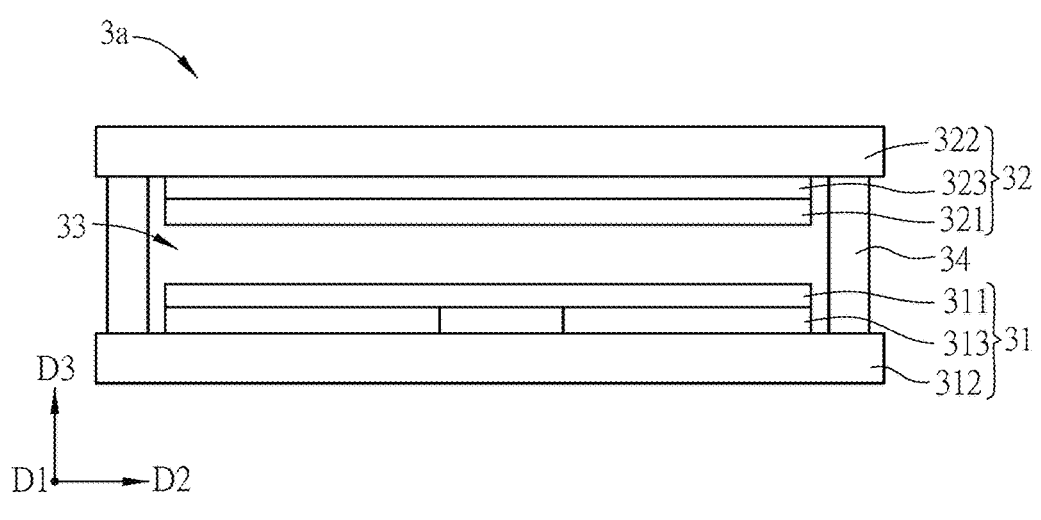
FIG. 2B is a sectional view of another display panel.

As shown in FIG. 2A, the display panel 3 includes a first substrate 31, a second substrate 32 and a liquid crystal layer 33 (the liquid crystal molecules are not shown). The liquid crystal layer 33 is sandwiched between the first substrate 31 and the second substrate 32. The first substrate 31 can be a TFT (thin-film transistor) substrate, and the second substrate 32 can be a CF (color filter) substrate. Of course, in other embodiments, the black matrix and color filter layer of the CF substrate can be disposed on the TFT substrate, so that the first substrate 31 is a BOA (BM on array) substrate or a COA (color filter on array) substrate.

The first substrate 31 includes a polymer thin film 311 and a transparent substrate 312, and the second substrate 32 includes a polymer thin film 321 and a transparent substrate 322. The polymer thin films 311 and 321 can be made of, for example but not limited to, polyimide (PI). The polymer thin film 311 is disposed on one side of the transparent substrate 312 facing the second substrate 32, and the polymer thin film 321 is disposed on one side of the transparent substrate 322 facing the first substrate 31. In addition, the display panel 3 further includes a light reaction monomer (not shown). In this case, the light reaction monomer can be mixed in the liquid crystal layer 33 and/or in the polymer thin films 311 and 321, and this disclosure is not limited. Moreover, the first substrate 31 further includes a first transparent conductive layer 313, and the second substrate 32 further includes a second transparent conductive layer 323. The first transparent conductive layer 313 or the second transparent conductive layer 323 can be made of indium-tin oxide (ITO), indium-zinc oxide (IZO), aluminum-zinc oxide (AZO), gallium-zinc oxide (GZO), or zinc oxide (ZnO), and this disclosure is not limited. Herein, the first transparent conductive layer 313 is disposed between the transparent substrate 312 and the polymer thin film 311, and the second transparent conductive layer 323 is disposed between the transparent substrate 322 and the polymer thin film 321. Besides, the display panel 3 may further include a sealing material 34 (e.g. a seal glue), which is disposed at the edges of the first substrate 31 and the second substrate 32 so as to form an enclosed space for accommodating the liquid crystal layer 33.

To be noted, the first transparent conductive layer 313 is a patterned transparent conductive layer, and the second transparent conductive layer 323 is a non-patterned transparent conductive layer. Of course, in other embodiments, the second transparent conductive layer 323 can also be a patterned transparent conductive layer. In this embodiment, the sealing material 34 is disposed between the polymer thin film 311, the first transparent conductive layer 313, the polymer thin film 321 and the second transparent conductive layer 323, and directly contacts with the polymer thin films 311 and 321. Alternatively, as shown in FIG. 2B, the polymer thin film 311, the first transparent conductive layer 313, the polymer thin film 321 and the second transparent conductive layer 323 are located in an enclosed space formed by the sealing material 34, the first substrate 31 and the second substrate 32. That is, the sealing material 34 is disposed between the transparent substrates 312 and 322, and directly contacts with the transparent substrates 312 and 322. The structures of the display panel 3 and 3a are for illustrations only and are not to limit this disclosure.

Referring to FIGS. 1A and 1B, the object 2 of this embodiment is a liquid crystal cell assembly for example. The exposure system 1 is not limited to perform the exposure process to one object 2 (a liquid crystal cell assembly) only. Of course, the exposure system 1 can be cooperated with an exchange device (not shown), which can change the panels, so that the exposure system 1 can perform the exposure process to multiple objects 2. For example, the exchange device may include a robot arm for holding the object 2 and loading/unloading the object 2. In other words, the exchange device can load/unload the object 2. In more detailed, the loading procedure is to use the robot arm to hold a to-be-exposed object 2 and place it on the carrying device 11, and the unloading procedure is to use the robot arm to hold an exposed object 2 and remove it from the carrying device 11. After the object 2 is loaded, the exposure system 1 executes the following procedures of aligning, pining and conducting the object 2 (the liquid crystal cell assembly). In practice, the exposure system 1 can perform the conducting procedure before the exposing procedure, or perform the conducting procedure and the exposing procedure simultaneously. The conducting procedure is to generate an electric field between the first transparent conductive layer 313 and the second transparent conductive layer 323 of the display panel 3 (of the liquid crystal cell assembly), so that the liquid crystal molecules can be arranged according to the pattern (slit pattern) of the first transparent conductive layer 313 of the first substrate 31. Accordingly, the light reaction monomers can be polymerized to from polymer alignment layer for achieving the desired liquid crystal alignment, thereby improving the optical properties (e.g. aperture ratio and contrast) of the display panel.

After the exchange device holds the object 2 and places the object 2 on the carrying device 11, the carrying device 11 moves and carries the object 2 so as to move the object 2 to the irradiation zone of the light source device 12. The carrying device 11 includes, for example but not limited to, a linear motor, a track, a robot arm and/or an air floating moving device. In this embodiment, the carrying device 11 is a mechanical moving device, which includes a supporting stage and a moving track.

The light source device 12 is disposed on the carrying device 11 for emitting light, which is for example but not limited to UV light, to irradiate the object 2. The light source device 12 includes a lamp box 124 and a plurality of lamp sets. The lamp sets are arranged in the lamp box 124 along a first direction D1. As shown in FIG. 1B, a row of lamps (two or more lamps) disposed along a second direction D2 are named as a lamp set. The second direction D2 crosses with the first direction D1. In particular, the second direction D2 is substantially perpendicular to the first direction D1. Since the size of the object 2 along the first direction D1 is larger than the length of one lamp, each of the lamp set is extending along the second direction D2, and multiple long lamps of each lamp set are connected along the second direction D2. In order to clearly show the arrangement of the lamp sets, the lamp box 124 in FIG. 1B is shown by dotted lines.

In this embodiment, the lamp sets have a first side S1 and an opposite second side S2 along the second direction D2, and the first side S1 and the second side S2 are uneven. In more detailed, the lamp sets are composed of multiple connected lamps and disposed in the lamp box 124, and the edges of the lamp sets located at the first side S1 and the second side S2 are misaligned, so that the first side S1 and the second side S2 form uneven shapes. That is, the sides S1 and S2 are not a line but an irregular shape.

In addition, the lamp sets includes a first lamp set 121 and a second lamp set 122, which are disposed adjacent to each other. In this embodiment, the first lamp set 121 is located at the center area of the multiple lamp sets and has a first lamp 1211 and a second lamp 1212. The second lamp set 122 includes a third lamp 1221 and a fourth lamp 1222. The lengths of the first lamp 1211 and the second lamp 1212 along the second direction D2 can be the same or different, and the lengths of the third lamp 1221 and the fourth lamp 1222 along the second direction D2 can also be the same or different. In this embodiment, the lengths of the first lamp 1211 and the second lamp 1212 along the second direction D2 are different, and the lengths of the third lamp 1221 and the fourth lamp 1222 along the second direction D2 are different, too.

The first lamp 1211 and the second lamp 1212 are extending along the second direction D2 and connected with a first junction P1, and the third lamp 1221 and the fourth lamp 1222 are extending along the second direction D2 and connected with a second junction P2. The first junction P1 and the second junction P2 are misaligned along the first direction D1. In other words, the junctions P1 and P2 of the first lamp set 121 and the second lamp set 122 are not located on an extension line L1 along the first direction D1 (misaligned). Moreover, the first lamp 1211 has a first end E1 located at a side of the light source device 12, and the third lamp 1221 has a second end E2 also located at the side of the light source device 12, which is the same side as the position of the first end E1. In more detailed, the light source device 12 can be divided into two parts by a center axis, and the two parts are defined as, for example, a right side and a left side. As shown in FIG. 1B, the first end E1 and the second end E2 are both located within the right side area. A shortest distance d between an extension line L1 of the first end E1 along the first direction D1 and another extension line L2 of the second end E2 along the first direction D1 is between 2% and 50% of the length of the first lamp 1211 (or the third lamp 1221) of the light source device 12 along the second direction D2 (2% of the length of the lamp≤the shortest distance d≤50% of the length of the lamp). To be noted, each of the first junction P1 and the second junction P2 can be a connector for connecting two lamps.

In addition, the light source device 12 further includes a third lamp set 123, which is not located adjacent to the first lamp set 121. The third lamp set 123 has a fifth lamp 1231 and a sixth lamp 1232, which are extending along the second direction D2. The fifth lamp 1231 and the sixth lamp 1232 are connected with a third junction P3, which is not located adjacent to the first junction P1 (or the second junction P2). The third junction P3 is located on an extension line from the first junction P1 along the first direction D1, and at least one lamp set is configured between the first junction P1 and the third junction P3. In other words, the first junction P1 is located at one side of at least one lamp set, while the third junction P3 is located at the other side of the at least one lamp set, and the junctions P1 and P3 are located on an extension line along the first direction D1. In the light source device 12 of the embodiment, there are six lamp sets are disposed between the first junction P1 and the third junction P3. This configuration is named as pattern 7. In more detailed, there are six lamp sets disposed between the first lamp set 121 and the third lamp set 123. The first junction P1 of the first lamp set 121 and the third junction P3 of the third lamp set 123 are located on an extension line along the first direction D1, and the junctions of the six lamp sets between the first lamp set 121 and the third lamp set 123 are not located on the extension line. Of course, in other embodiments, it is also possible to disposed different number of lamp sets (e.g. 4 lamp sets, which is named as pattern 5) between the first junction P1 and the third junction P3. This disclosure is not limited. To be noted, the third junction P3 can be a connector for connecting two lamps.

Figure 3:
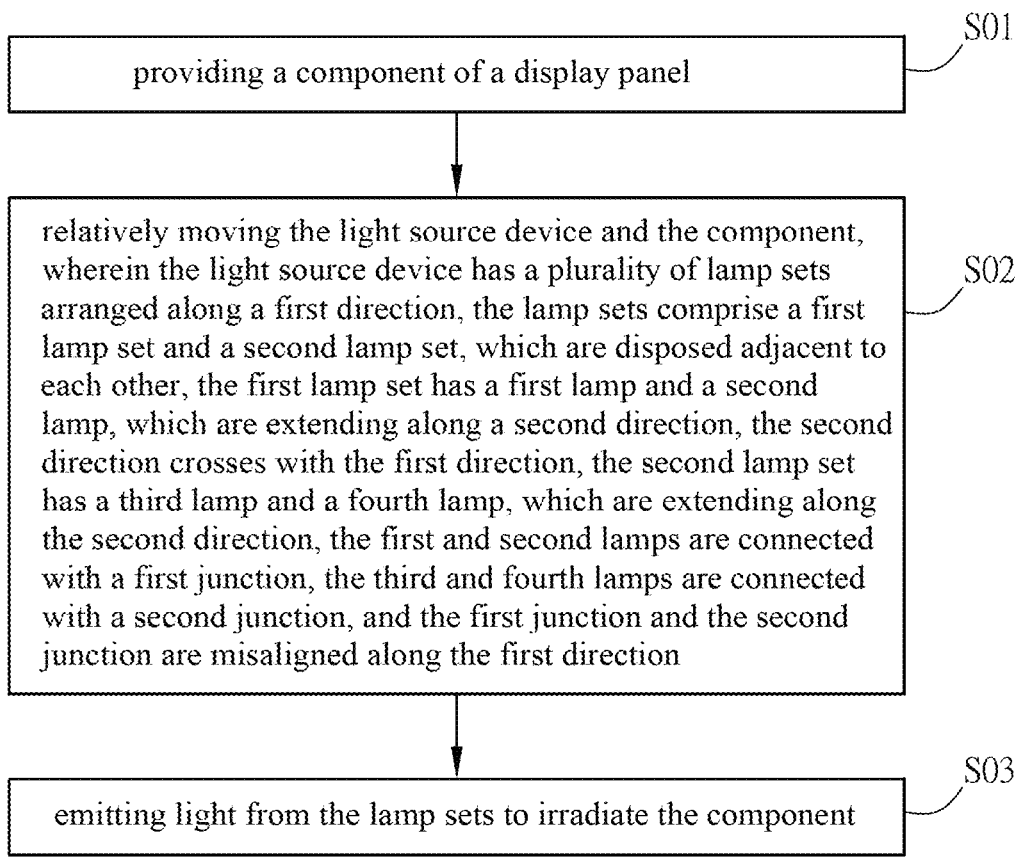
FIG. 3 is a flow chart of a manufacturing method of a component of a display panel according to an embodiment of the disclosure.

The exposure method according to an embodiment of the disclosure will be described hereinafter with reference to FIG. 3 in view of FIGS. 4A to 4E. FIG. 3 is a flow chart of a manufacturing method of a component of a display panel according to an embodiment of the disclosure, and FIGS. 4A to 4E are schematic diagrams showing the operations of the exposure system 1 performing the steps of the manufacturing method of FIG. 3. To make the following description more clear, FIGS. 4A to 4E only show the object 2 and the multiple lamp sets of the light source device 12 of the exposure system 1. In the manufacturing method of this embodiment, the component of the display panel can be referred to the object 2 in FIGS. 4A to 4E.

The manufacturing method of a component of a display panel in the disclosure is applied to an exposure system 1 to perform an exposure process to a component of a display panel (or an object 2). The exposure system 1 includes a carrying device 11 and a light source device 12. The carrying device 11 carries the component (object 2), and the light source device 12 is disposed on the carrying device 11 and emits light to irradiate the component (object 2). As shown in FIG. 3, the manufacturing method of the disclosure includes the following steps S01 to S03.

The step S01 is to providing the component of the display panel. In this embodiment, the component of the display panel can be referred to the above mentioned object 2, which can be a liquid crystal cell assembly or a transparent substrate with an alignment film. The step S02 is to relatively move the light source device 12 and the component (object 2). Herein, the light source device 12 has a plurality of lamp sets arranged along a first direction D1. The lamp sets include a first lamp set 121 and a second lamp set 122, which are disposed adjacent to each other. The first lamp set 121 has a first lamp 1211 and a second lamp 1212, which are extending along a second direction D2. The second direction D2 crosses with the first direction D1. In particular, the second direction D2 is substantially perpendicular to the first direction D1. The second lamp set 122 has a third lamp and a fourth lamp, which are extending along the second direction. The first lamp 1211 and the second lamp 1212 are connected with a first junction P1, and the third and fourth lamps are connected with a second junction. The first junction P1 and the second junction are misaligned along the first direction. To be noted, the step S02 is to linearly move either one or both of the lamp sets and the component (object) along the first direction or the second direction, to linearly move both of the lamp sets and the component (object) along the counter directions (the first and second directions), respectively, or to rotate either one or both of the lamp sets and the component (object). This disclosure is not limited. Then, the step S03 is to emit light from the lamp sets to irradiate the component (object 2).

Figure 4A:
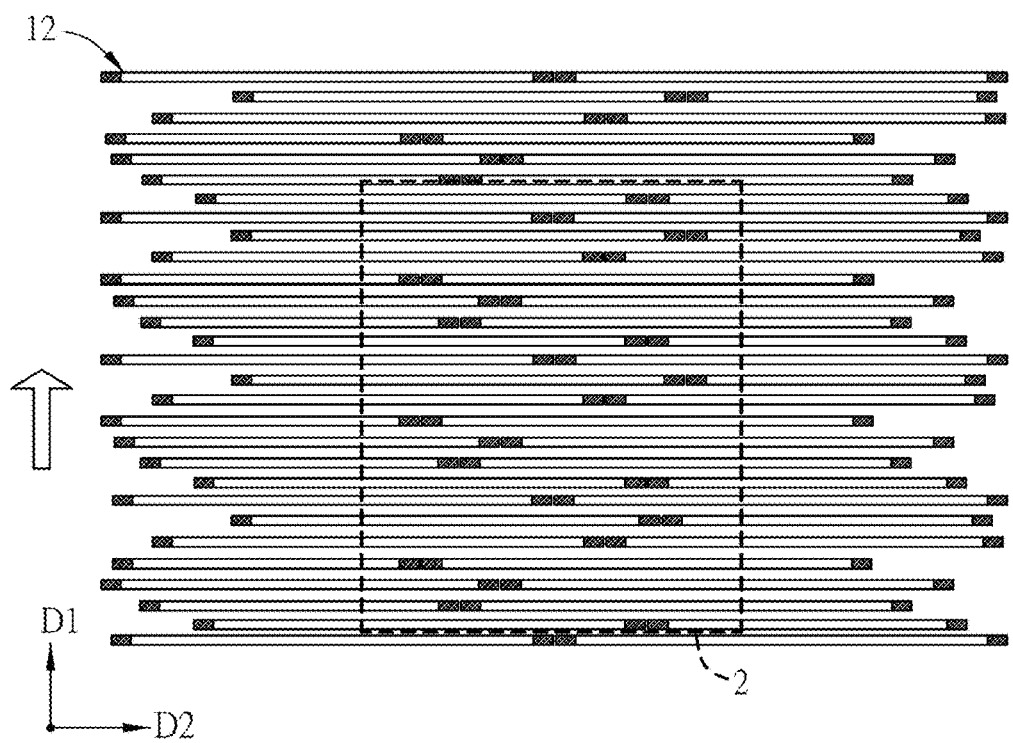
FIGS. 4A to 4E are schematic diagrams showing the operations of exposure system performing the steps of the manufacturing method of FIG. 3.
Figure 4B:
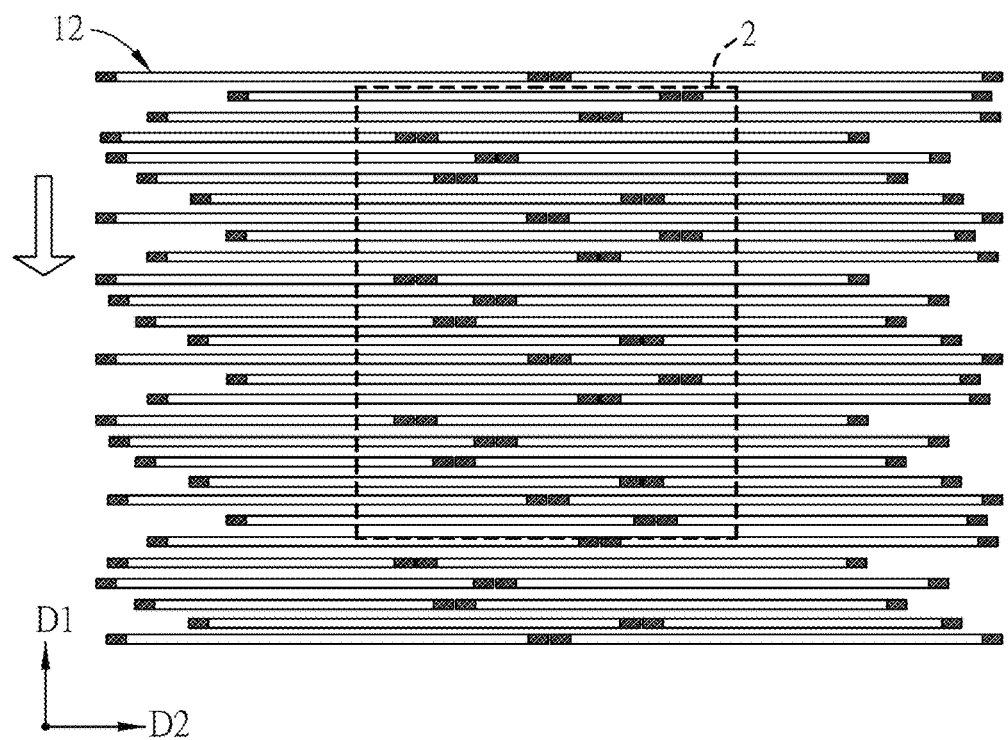

In the step S02 of relatively moving the light source device 12 and the component (object 2), the light source device 12 and the component (object 2) are relatively moved along the first direction D1. In this embodiment, as shown in FIGS. 4A and 4B, the multiple lamp sets of the light source device 12 are moved up and down. That is, the light source device 12 is moved with respect to the object 2 (component) along the first direction D1. However, this disclosure is not limited thereto. In other embodiments, the light source device 12 is not moved, and the object 2 (component) is moved up and down along the direction D1. The object 2 (component) can be moved by the carrying device 11 or other devices. Otherwise, the light source device 12 and the object 2 (component) can be both moved so as to relatively move the light source device 12 and the object 2 (component) along the first direction D1, and this disclosure is not limited.

Figure 4C:
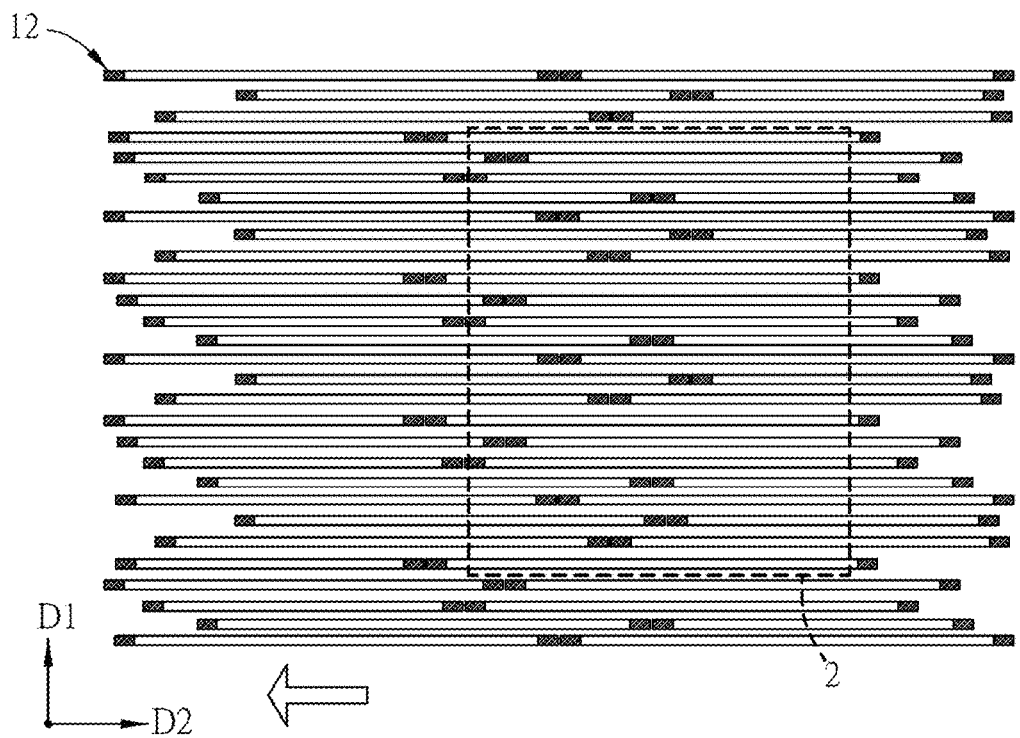
Figure 4D:
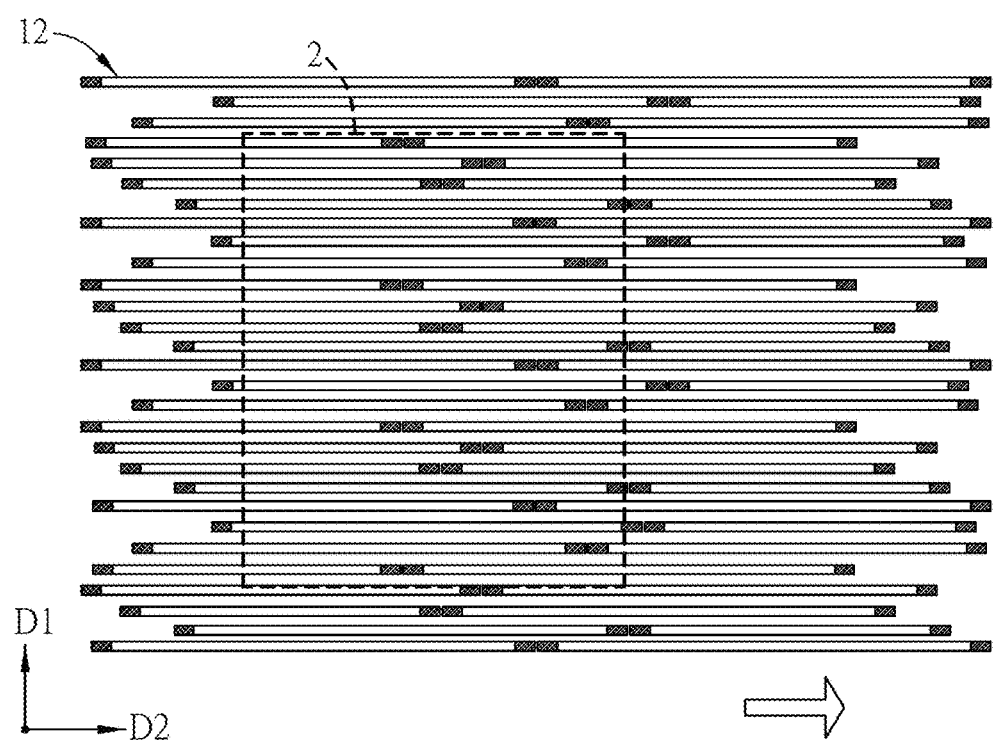
Figure 4E:
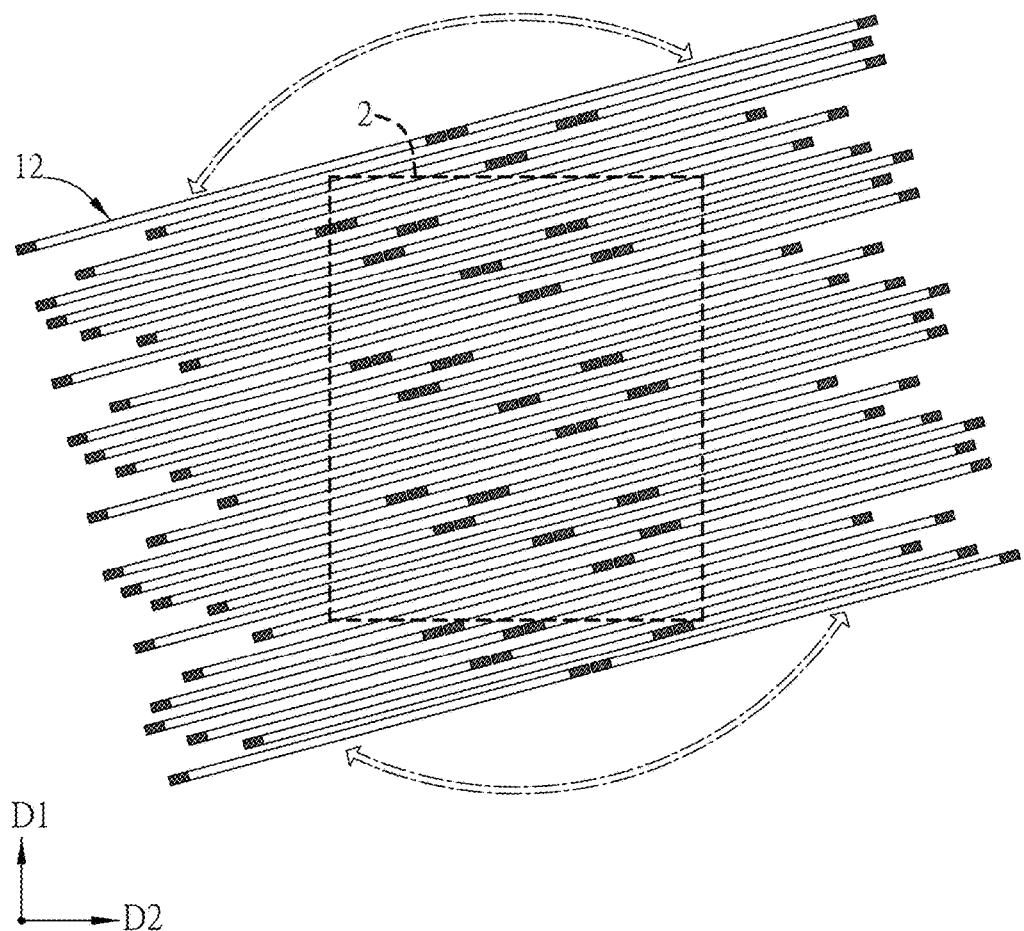

In another embodiment, as shown in FIGS. 4C and 4D, the light source device 12 and the object 2 (component) may be relatively moved (left and right) along the second direction D2. To be noted, the light source device 12 and the object 2 (component) can have larger relative moving range in the first direction D1 as shown in FIGS. 4A and 4B, so the exposure system 1 has better performance. In another embodiment, as shown in FIG. 4E, the light source device 12 and the object 2 (component) are relatively rotated. In this case, the light source device 12 is rotated around the object 2 (component). The moving or rotating method is not limited in this disclosure.

To be noted, regardless the moving and rotating method, the lamps of the light source device 12 emit light to an irradiation zone on the plane defined by the first direction D1 and the second direction D2. In the above-mentioned step S02, the component (object 2) is always located within the irradiation zone. As shown in FIGS. 4A and 4B, in a third direction D3 substantially perpendicular to the first direction D1 and the second direction D2, the lamp sets must completely cover the entire object 2 (component) in the step S02 of relatively moving the lamp sets and the object 2 (component). In other words, in the top view (the third direction D3), the moving object 2 (component) is not out of the covering range of the lamp sets, so that the object 2 (component) is always staying in the irradiation zone. As viewing the lamp sets along the third direction, the projection area of the lamp sets is greater than that of the object 2 (component), such as a liquid crystal cell assembly.

In one embodiment, the distance between the light source device 12 and the object 2 (component) along the third direction D3 is 38 mm. If the light source device 12 and the object 2 (component) are not relatively moved, the exposure uniformity of the object 2 is ±25.9%. If the light source device 12 and the object 2 (component) are relatively moved along the first direction D1, the exposure uniformity of the object 2 (component) will be ±11.1% under the same light amount. To be noted, the lower the percentage of the exposure uniformity is, the higher the exposure uniformity is. In another embodiment, the distance between the light source device 12 and the object 2 (component) along the third direction D3 is 900 mm. If the light source device 12 and the object 2 (component) are not relatively moved, the exposure uniformity of the object 2 (component) is ±8.6%. If the light source device 12 and the object 2 (component) are relatively moved along the first direction D1, the exposure uniformity of the object 2 (component) will be ±1.8% under the same light amount.

In still another embodiment, the distance between the light source device 12 and the object 2 (component) along the third direction D3 is 38 mm. If the light source device 12 and the object 2 (component) are relatively moved, the exposure uniformity of the object 2 (component) is ±16% as using the light source device in pattern 5 to irradiate the object 2 (component), and the exposure uniformity of the object 2 (component) is ±11% as using the light source device in pattern 7 to irradiate the object 2 (component) with the same light amount. This result indicates that more lamp sets are configured between two lamp sets with junctions located at the extension line along the first direction D1 can provide a lower percentage of exposure uniformity to the object 2 (component), which means a better exposure uniformity in the exposure process.

As mentioned above, the light source device 12 of the exposure system 1 includes a plurality of lamp sets, each of which is composed of connected bar-type lamps. Accordingly, the junction between two lamps has relative lower illuminance. When using the fixed light source with fixed illuminance to irradiate the object 2 (component) located at the same place, the exposure uniformity of the object 2 (component) can't fit the requirement. In this embodiment, the junctions P1 and P2 of the adjacent lamp sets 121 and 122 of the light source device 12 are misaligned in the first direction D1, and the light source device 12 and the object 2 (component) are relatively moved. Therefore, the percentage of the exposure uniformity of the object under the same amount of light is lower, thereby achieving the purpose of high exposure evenness of the object 2 (component).

In this disclosure, the junctions of the adjacent lamp sets of the light source device are misaligned in one direction, and the light source device and the object are relatively moved. Compared with the conventional art, the percentage of the exposure uniformity of the object or component under the same amount of light is lower, thereby achieving the purpose of high exposure evenness.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A manufacturing method of a component of a display panel, comprising steps of:
providing the component of the display panel;
relatively moving a light source device and the component, wherein the light source device has a plurality of lamp sets arranged along a first direction, the lamp sets comprise a first lamp set and a second lamp set, which are disposed adjacent to each other, the first lamp set has a first lamp and a second lamp, which are extending along a second direction crossing with the first direction, the second lamp set has a third lamp and a fourth lamp, which are extending along the second direction, the first and second lamps are connected with a first junction, the third and fourth lamps are connected with a second junction, lengths of the first lamp and the second lamp along the second direction are different, and the first junction and the second junction are misaligned along the first direction; and
emitting light from the lamp sets to irradiate the component.

2. The manufacturing method according to claim 1, wherein the step of relatively moving the light source device and the component is to relatively move the lamp sets and the component along the first direction or the second direction, or to relatively rotate the lamp sets and the component.

3. The manufacturing method according to claim 1, wherein the lamp sets emit light to irradiate an irradiation zone, and the component is within the irradiation zone in the step of relatively moving the light source device and the component.

4. The manufacturing method according to claim 1, wherein the first lamp has a first end located at a side of the light source device, the third lamp has a second end located at the side of the light source device, and a shortest distance between an extension line of the first end along the first direction and another extension line of the second end along the first direction is greater than or equal to 2% of the length of the first lamp of the light source device along the second direction, and is less than or equal to 50% of the length of the first lamp of the light source device along the second direction.

5. The manufacturing method according to claim 1, wherein the lamp sets have a first side and an opposite second side along the second direction, and the first side and the second side are not even.

6. The manufacturing method according to claim 1, wherein the lamp sets completely cover the component on a third direction, which is substantially perpendicular to the first and second directions.

7. The manufacturing method according to claim 1, wherein the lamp sets further comprises a third lamp set, which is not disposed adjacent to the first lamp set, the third lamp set has a fifth lamp and a sixth lamp, which are extending along the second direction, the fifth and sixth lamps are connected with a third junction, the third junction is located on an extension line from the first junction along the first direction, and at least one lamp set is configured between the first and third junctions.

8. The manufacturing method according to claim 1, wherein the component is a liquid crystal cell assembly or a transparent substrate with an alignment film.

9. The manufacturing method according to claim 1, wherein the light emitted from the light source device is a polarized light.

* * * * *